US006949393B2

(12) United States Patent
Van Aerle

(10) Patent No.: US 6,949,393 B2
(45) Date of Patent: Sep. 27, 2005

(54) METHOD OF MANUFACTURING DISPLAY CELLS

(75) Inventor: Nicolaas Aldegonda Jan Maria Van Aerle, Heerlen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 482 days.

(21) Appl. No.: 10/066,986

(22) Filed: Feb. 4, 2002

(65) Prior Publication Data

US 2002/0122150 A1 Sep. 5, 2002

(30) Foreign Application Priority Data

Feb. 8, 2001 (EP) ............................................ 01200459

(51) Int. Cl.[7] ................................................ H01L 21/00

(52) U.S. Cl. ......................... 438/34; 349/153; 349/190; 438/35; 438/48

(58) Field of Search ............................ 359/80, 81, 153, 359/155, 190; 438/14, 18, 22–24, 30, 34, 35, 48; 349/153, 190

(56) References Cited

FOREIGN PATENT DOCUMENTS

WO WO 9519587 7/1995 ......... G02F/1/1339

OTHER PUBLICATIONS

"Manufacturing of Large Wide–View Angle Seamless Tiled AMLCDs for Business and Consumer Applications", IDMC 2000, pp. 191–193.

Patent Abstracts of Japan, Yamaguchi Takatoshi, "Liquid Crystal Display Device," Publication No. 10078761, Mar. 24, 1998, Application No. 08232709, Sep. 3, 1996.

Patent Abstracts of Japan, Nakahara Hiroki, "Method For Inspecting Wiring Board And Manufacture Of Liquid Crystal Device," Publication No. 11295755, Oct. 29, 1999, Application No. 10097996, Apr. 9, 1998.

*Primary Examiner*—Asok Kumar Sarkar

(57) ABSTRACT

By placing the contact region for contacting row lines along a side parallel to the side having a column region for contacting row lines, the border of the LC device can be reduced because spacing relative to scribe and break lines is smaller.

11 Claims, 3 Drawing Sheets

METHOD OF MANUFACTURING DISPLAY CELLS

Figure 1:
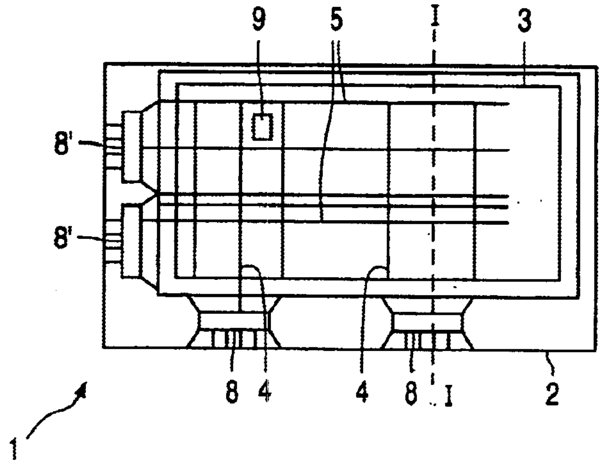

The invention relates to methods of manufacturing a plurality of display cells, in which method at least a first group of electrodes and a further group of electrodes for driving the pixels via switching elements are provided on at least a first substrate.

In this context, a display cells is understood to mean a functional part of a display device which, if provided with the correct drive voltages, for example, by means of further drive electronics such as "drivers", can display an image. Said display devices are used in, for example, GSM telephones but also in other portable applications, for example, as view finders in video cameras, and in "organizers". Examples of such display cell devices are liquid crystal display cells (LCD) and parts of (polymer) LED display devices, but also, for example, parts of display devices based on field emission, switching mirrors, electrophoresis, etc.

Display devices of the type described above are known for displaying information by means of electro-optical display media such as liquid crystals, electrophoretic suspensions and electrochromic materials. The known display cell usually comprises a system of pixels arranged in rows and columns, while (picture) electrodes arranged on a substrate correspond to each pixel. For presenting selection and data signals to the pixels, groups of electrodes are arranged on the substrate. These are generally divided into row electrodes or selection electrodes and column electrodes or data electrodes which are usually arranged in a matrix configuration. In the case of active drive, switching elements (thin-film transistors) which are selected by means of the row electrodes are present at the crossings of row electrodes and column electrodes. To provide the row electrodes and column electrodes with the correct selection voltages and data voltages, drive ICs are present on said substrate (or foils with drive IC s), generally along the edges. In a matrix structure of the pixels, they are present, for example, along two mutually perpendicular sides of the actual display section. This is at the expense of the substrate surface area required for the display device.

This limits, for example, the maximum width of the actual display screen in a mobile telephone. Since one (or more) edge(s) with drive ICs must be taken into account, the width of the housing (in this example of the telephone) must be chosen to be larger than the width of the actual display screen. Moreover, the ICs have a given height so that no other functional elements such as knobs, keys etc. can be realized at the area of these ICs.

During the manufacture of substrates on which a group of electrodes is arranged, electrostatic charge or discharge may also take place. Such a voltage difference may then be produced between electrodes of the group of electrodes that there is breakdown between the electrodes, which may damage the electrodes and switching elements, for example TFTs. Due to such damage, given pixels (or rows and/or columns of pixels) can no longer be driven so that the quality of the displayed image is influenced detrimentally. Electric breakdown or flashover between the electrodes results in rejection of the display device. Generally, it holds that as the manufacture of the display device is in a further stage of the process, for example, up to the trial phase of the display cell, damage and consequent rejection due to electrostatic discharge is extremely costly.

A drawback of the known display device is that a large number of (extra) switching elements is necessary for reducing electrostatic discharge. Such (extra) switching elements increase the complexity of the design and are themselves a possible source of rejection.

It is an object of the invention to provide a method of the type described in the opening paragraph, in which the substrates have a minimal surface area so that a minimal quantity of substrate material (glass, synthetic material) is lost during manufacture of the display devices.

It is a further object to provide such a method in which damage due to electrostatic discharge is avoided as much as possible in a simple manner, at least during a part of the manufacturing process.

To this end, in a method according to the invention, at least a first group of electrodes and a further group of electrodes for driving the pixels via switching elements are arranged on a first substrate, the first group of electrodes and connection conductors for the further group of electrodes being parallel and extending as far as connections for the electrodes and the connection conductors, while the groups of display devices are mutually separated in a direction parallel to the direction of the electrodes and connection conductors for the further group of electrodes.

In an intermediate step, a second substrate is provided (for example, in the case of LCDs), or parts of the pixels are provided (for example, in the case of (O)LEDs).

The inventor has recognized that no space for the contacts needs to be kept free along other parts of the edge because the group of electrodes and connection conductors for the further group of electrodes are now contacted along one part of the edge (or two parallel parts, so that the substrate space can be utilized optimally, at least in one dimension. Consequently, it is not necessary or hardly necessary to take tolerances in the direction transverse to these sides into account, while much less substrate material is lost, particularly when manufacturing smaller display devices.

It is to be noted that contacting, for example, row and column electrodes on one side is known per se from the article "Manufacturing of Large Wide-View Angle Seamless Tiled AMLCDs for Business and Consumer Applications", IDMC 2000, pp. 191–193. However, this article only emphasizes the advantages of the feature of contacting on the one side and its advantages for "tiling" a plurality of display components. The additional advantages of such a way of connection in the manufacture of single display devices, namely the mutual positioning of the substrates without substantially any tolerance on remaining parts of the edge, are not recognized at all in this article.

In a particular embodiment, the electrodes and connection conductors for the further group of electrodes of a plurality of display cells are interconnected. This provides the possibility of simultaneously presenting test patterns to the electrodes or connection conductors for the electrodes of the group of display devices and to measure the response of the display devices. A plurality of cells is then simultaneously tested via test patterns to be presented once to all cells.

Due to the reduced "handling", the risk of electrostatic breakdown is reduced in this stage of the manufacturing process.

These and other aspects of the invention are apparent from and will be elucidated with reference to the embodiments described hereinafter.

In the drawings:

FIG. 1 is a diagrammatic plan view of a conventional display device.

Figure 2:
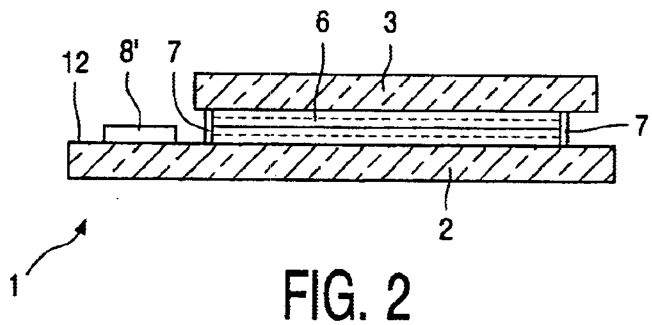
Figure 3:
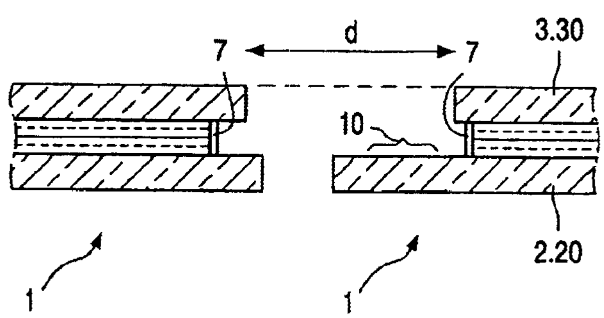
Figure 4A:
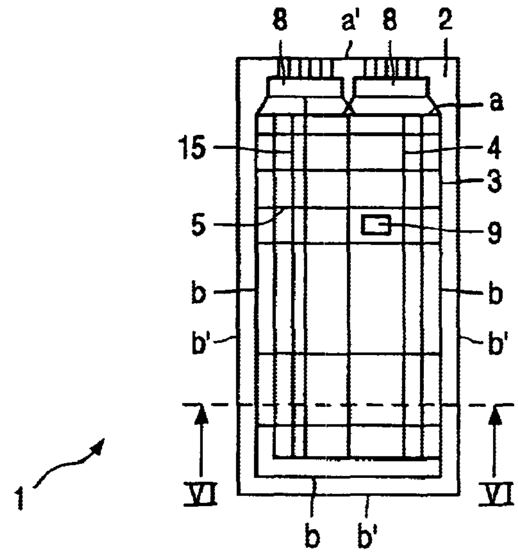
Figure 4B:
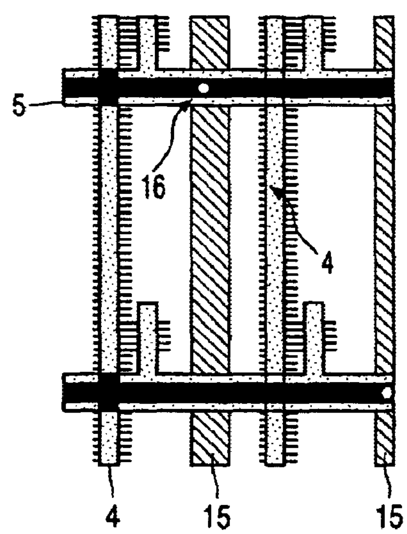
Figure 5:
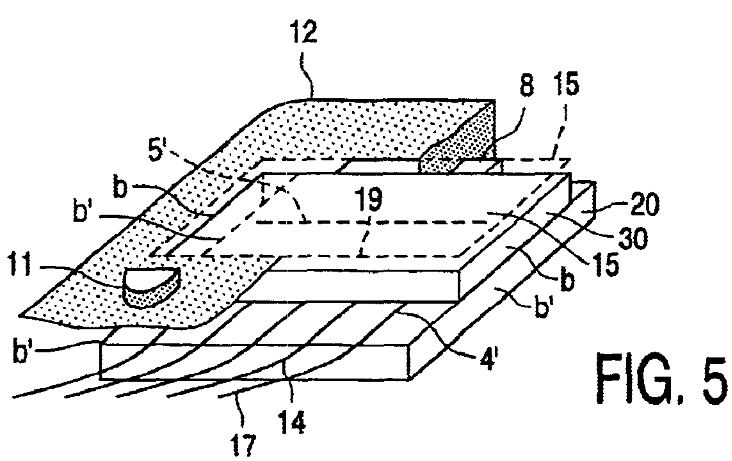
Figure 6:
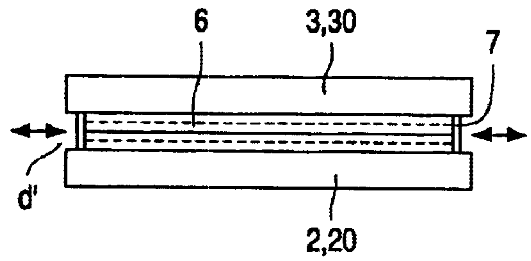
Figure 7A:
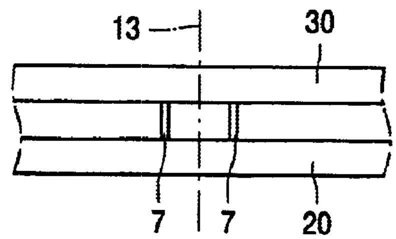
Figure 7B:
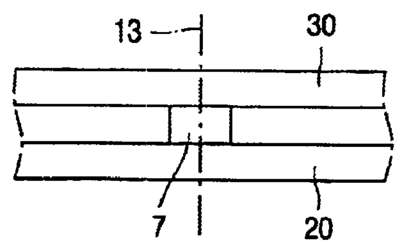
Figure 8:
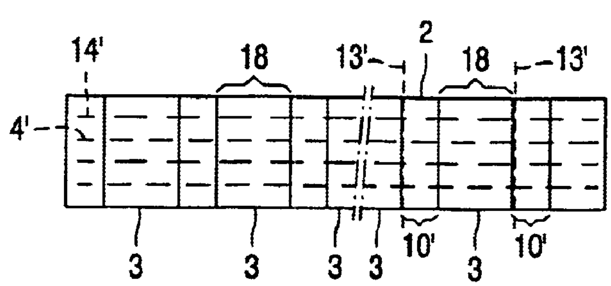

FIG. 2 is a diagrammatic cross-section of a part of the liquid crystal display device (LCD), taken on the line II—II in FIG. 1, FIG. 3 shows diagrammatically a step of manufacturing a part of the display device of FIG. 2, FIG. 4 is a diagrammatic plan view of a part of a liquid crystal display device (LCD) according to the invention, while FIG. 5 is a diagrammatic elevational view of a variant of the device of FIG. 4, FIG. 6 is a diagrammatic cross-section taken on the line VI—VI in FIG. 4A, while FIG. 7 shows a step of manufacturing the display device of FIG. 6, and FIG. 8 shows a plurality of cells in the manufacturing stage.

The Figures are purely diagrammatic and not drawn to scale. For the sake of clarity, some dimensions are strongly exaggerated. Similar components in the Figures are denoted as much as possible by the same reference numerals.

FIG. 1 is a very diagrammatic plan view of a conventional display device 1 of the flat type. The display device comprises a first substrate 2 which is provided with a pattern of pixels 9 which, in this example, are separated from each other at a predetermined distance in the vertical and the horizontal direction. Each pixel 9 is present at the crossing of electrodes 4 of a group of electrodes arranged in vertical columns and electrodes 5 of a further group of electrodes arranged in horizontal rows. The electrodes 4 of the group of electrodes are also referred to as column electrodes and the electrodes 5 of the further group of electrodes are also referred to as row electrodes. The pixels are selected in generally known manner and provided with data via thin-film transistors (TFTs) which are not shown in FIG. 1. Electrodes 4 receive data drive signals from a drive circuit 8 and electrodes 5 receive select signals via a drive circuit 8'.

To realize an image or a data graphic image on a relevant area of the surface of substrate 2, the display device uses a scan control circuit which is integrated in, for example, the drive circuits 8, 8'. Various types of electro-optical materials may be used in the display device. When, for example, a material is used whose state of polarization of the incident light changes, the display device is placed between a pair of filters which change the polarization of (visible) light.

FIG. 2 is a diagrammatic cross-section, taken on the line II—II, of a part of the display device of FIG. 1, in this example a liquid crystal display device (LCD) which comprises a first substrate 2 and a second substrate 3 between which, for example, a twisted nematic or ferroelectric liquid crystalline material 6 is present. The assembly is sealed in generally known manner by means of a sealing rim 7 having a filling aperture (not shown). If necessary, the inner surfaces of the substrates 2 and 3 are provided with electrically and chemically insulating layers (not shown). It is to be noted that the surface 12 of the first substrate 2 is larger than that of the second substrate 3, which is due, inter alia, to the presence of the drive circuits 8, 8'. This does not only apply to the cross-section of FIG. 2, but also to the cross-section perpendicular to that of FIG. 2. The overlapping parts of the substrates 2, 3 define the actual display section (within which liquid crystal material is present in this example). The LCD may be of the transmissive or reflective type.

Parts of such LCDs (cells) are usually manufactured simultaneously in larger numbers between two glass plates 20, 30. For the purpose of filling, (rows of) unsplit individual cells are obtained by means of "scribing and breaking". To ensure a maximal yield during breaking, a given minimum distance (denoted by the double arrow d in FIG. 3) must be taken into account, which distance is 3 to 6 mm in the conventional processes. The distance also depends on a possible space, denoted by braces 10 for the ICs 8 or for contacts (for example, via tape carrier packaging or by means of a flexible foil). It will be evident that a large quantity of glass will be lost in this case.

According to the invention, and as shown in FIG. 4, column electrodes 4 (vertical column electrodes in this example) are present on the first substrate 2, which column electrodes extend as far as a first part (a) of an edge of the substrate 3 and adjoin connection conductors 4' which are supplied with the required voltages by means of drive ICs 8 for driving the pixels 9. The drive ICs 8 are also present on the substrate 2. In the horizontal direction, row electrodes 5 (in this example) are present on the substrate 2, which row electrodes make contact via through connections or vias 16 (see the plan view in FIG. 4B) with vertically extending connection conductors 15 (which are transparent in this example) which are also supplied with the required voltages by means of the drive ICs 8 for driving the pixels 9. The part b of the edge of the substrate 3 now substantially coincides with the corresponding part b' of the substrate 2.

A vertically extending connection conductor 15 (transparent in this example), which extends parallel to the vertical column electrodes 4, corresponds to each row electrode and also extends as far as the first part (a) of the edge of the substrate 3 and adjoins connection conductors 4' which are supplied with the required voltages by means of drive ICs 8.

Since all connections to the column electrodes and the row electrodes (via the connection conductors 15) are now present on the substrate part near the edge a of the substrate, the tolerances as indicted in FIG. 3 by means of the double arrow d need not be taken into account, at least in one direction, in the device of FIG. 4A.

The same applies to another embodiment which is shown in an elevational view in FIG. 5. Now, for example, the row electrodes are provided with row selection signals (by means of IC 8) via connection conductors 15 which are similar to those in FIGS. 4A,B, while data signals are presented to column electrodes 4 by means of a flexible foil 17. The foil 17 is provided with conductor tracks 14 which (possibly via conductors 4) supply the column electrodes with voltages. Such a structure is very suitable for mobile (hand-held) applications because the usable picture surface area (shown by way of broken lines 19 in FIG. 5) is maximal in the direction of the row electrode so that a maximal line length is obtained. In principle, the edges b, b' can coincide with the inner wall of the housing 12, for example, because the substrates 2, 3 are clamped, as it were, in the housing, while pressure contacts 11 (for example, telephone keys just underneath the image) at the location of the electrodes 4' can be placed substantially against the cell without these pressure contacts or connections connected thereto disturbing the functionality of the connections 4' or of the conductors 14.

This ensures a considerably more economical use of glass, as is shown In FIG. 6. Now, tolerances (indicated by the double arrow d' in FIG. 6) must be taken into account, which tolerances are mainly determined by the small dimensions of the lines along which scribing and breaking takes place (line 13 in FIG. 7A). The line of intersection 13 may then lie between the sealing rims 7, but also intersect it, as is shown in FIG. 7B.

Since the external connection conductors 4', 15' (FIG. 5) are parallel, they can be jointly formed in one track, i.e. as continuous conductors 4, 4' and 15, 15', respectively, for a plurality of cells, as is shown diagrammatically in FIG. 8

(the cells are present at the area of the braces 18 and are separated by border areas 10'). The complete row of cells can now be provided with test patterns from two sides (in this example) or from one side (device of FIG. 4A). Corresponding pixels in the various cells react (become light or dark in the case of liquid crystal cells, luminesce in the case of LEDs), which is optically registered (simultaneously). This allows rapid testing, while the risk of electrostatic breakdown is considerably reduced in this manufacturing stage.

The invention is of course not limited to the examples described above. Notably, connection on one side is favorable in applications in which a display is inserted into a connector block. The invention is neither limited to liquid crystalline display devices but may also be used in display devices based on, for example, field emission, electroluminescence, switchable (hybrid) mirrors etc. The ICs do not necessarily have to be mounted on the substrate. For example, they may be provided on a tape or foil if use is made of TCP (tape carrier package) or COF (chip-on-foil) techniques.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. A method of manufacturing a plurality of display cells, comprising:

arranging at least a first group of electrodes and a second group of electrodes for driving pixels of a cell of the plurality of display cells via switching elements on a first substrate, the first group of electrodes and the connection conductors being substantially parallel, providing a second substrate for coupling to the first substrate, and separating groups of display devices in a direction parallel to the first group of electrodes.

2. The method of claim 1, including:

interconnecting at least one of the first group of electrodes and the connection conductors of a-two or more cells of the plurality of display cells, providing test patterns on the at least one of the electrodes or the connection conductors of the two or more cells, and determining a response of each of the two or more cells.

3. The method of claim 1, wherein each of the connection conductors extends from an edge of the display cell to at least as far as a location of a connection for the connection conductors.

4. The method of claim 1, wherein each of the connection conductors extends across multiple display cells.

5. The method of claim 4, including providing test patterns to the connection conductors, and determining a response to the test patterns at each of the multiple display cells.

6. The method of claim 4, wherein each of the first group of electrodes extends across multiple display cells.

7. The method of claim 6, including providing test patterns to the connection conductors and the first group of electrodes, and determining a response to the test patterns at each of the multiple display cells.

8. The method of claim 1, wherein each of the first group of electrodes extends across multiple display cells.

9. The method of claim 8, including providing test patterns to the first group of electrodes, and determining a response to the test patterns at each of the multiple display cells.

10. A method of manufacturing a plurality of display cells, the method comprising at least the steps of a) arranging at least a first group of electrodes and a further group of electrodes for driving the pixels via switching elements on a first substrate, the first group of electrodes and connection conductors for the further group of electrodes being parallel and extending as far as connections for the electrodes and the connection conductors, b) providing parts of the pixels, c) separating groups of display devices in a direction parallel to the direction of the electrodes and connection conductors for the further group of electrodes.

11. A method of manufacturing a plurality of display cells, comprising:

arranging at least a first group of electrodes and a second group of electrodes for driving pixels via switching elements on a first substrate, the first group of electrodes and the connection conductors providing a second substrate for coupling to the first substrate, providing parts of the pixels; and separating groups of display devices in a direction parallel to the direction of the first group of electrode.

* * * * *